(12) United States Patent
Hamadou et al.

(10) Patent No.: US 6,347,285 B1
(45) Date of Patent: Feb. 12, 2002

(54) DEVICE FOR COLLECTING ANALOGUE MEASUREMENT SIGNALS FOR THE ACOUSTIC DIAGNOSIS OF TEST PIECES

(75) Inventors: Mehdi Hamadou, Erlangen; Karl-Heinz Maier; Klaus-Dieter Müller, both of Nürnberg, all of (DE)

(73) Assignee: Siemens A.G., Munich (DE)

( * ) Notice: Subject to any disclaimer, the term of this patent is extended or adjusted under 35 U.S.C. 154(b) by 0 days.

(21) Appl. No.: 09/214,481
(22) PCT Filed: Jun. 24, 1997
(86) PCT No.: PCT/DE97/01313
 § 371 Date: Jun. 18, 1999
 § 102(e) Date: Jun. 18, 1999
(87) PCT Pub. No.: WO98/01728
 PCT Pub. Date: Jan. 15, 1998

(30) Foreign Application Priority Data

Jul. 5, 1996 (DE) .................................. 296 11 558 U

(51) Int. Cl.⁷ ............................................... G01H 11/00
(52) U.S. Cl. ............................. 702/56; 702/33; 702/54; 324/207.25; 73/570; 73/593; 73/662; 73/861.18
(58) Field of Search .......................... 702/56, 33, 34, 702/35, 54; 73/593, 659, 660, 66, 460, 476, 570, 649, 662, 861.18; 324/207.25, 226, 683

(56) References Cited

U.S. PATENT DOCUMENTS

| 4,885,707 A | 12/1989 | Nichol et al. |
| 5,363,701 A | 11/1994 | Lee et al. |
| 5,511,422 A | 4/1996 | Hernandez |

FOREIGN PATENT DOCUMENTS

| DE | 44 06 723 | 9/1994 |
| WO | WO 97/14091 | 3/1997 |
| WO | WO 97/14021 | 4/1997 |

OTHER PUBLICATIONS

** Guido Lülf and Ulrich Klein, "Dem Schadenfall zuvorkommen", Technische Rundschau, 17/91, S. 34–41.
** Paul Profos and Tilo Pfeifer, Handbuch der industriellen Messtechnik, R. Oldenbourg Verlag München Wien 1992, S. 277–280, 290–312.
** Georg Weidner and Gisbert Lechner, Klapper und Rasselgeräusche in Fahzeuggetrieben, "Simulation auf Prüfstand und Rechner", ATZ Automobiltechnische Zeitschrift 92 (1990), 6, S. 320–323, 326.
** H.G. Kagerl, "Körperschallmessung zur Qualitätsbewertung an Zahnradgetrieben", Feingeratetechnik, Berlin 36 (1987), 4. S. 153–155.
** W.Atherton, "Rechnergestützte Qualitäskontrolle bei der Fertigung von Wellen und Zahnrädern", Automobil–Industrie 2/85, S. 179–182.
 H. Kampa, "Flexibles rechnergesteuertes Messgerät zum Prüfen von Innengewinden", Technisches Messen tm, 52, Jg., H. Dec. 1985, S. 465–470.
** Gerhard Lochmann, "Flexible Fertigungssysteme als Komponenten von CIM", Technische Rundschau 47/85, S. 36–41.

(List continued on next page.)

Primary Examiner—Marc S. Hoff
Assistant Examiner—Hien Vo

(57) ABSTRACT

Analog test signals may be picked up from the test object with vibration sensors. A computer is equipped with a standard interface card which is connected by an interface, preferably parallel interface, and serves to digitize the test signals. A switching means serves to generate a trigger signal which can be input over a preferably serial interface. An executive routine in the computer switches the input of test signals on and off via the trigger signal.

24 Claims, 1 Drawing Sheet

OTHER PUBLICATIONS

** Claus P. Keferstein, "Automatisch geprüft und für Gut befunden", Messen, Prüfen, automatisieren, 29. Jg., 1993, H. 10, S. 5–9.

** Diagnose per Mikrofon, Messen, prüfen, automatisieren, 29, Jg., 1993, H. 7/8, S. 14, 15.

* C' T Magazin für Computer Technik, Apr. 1995, pp. 474, 478, 480*.

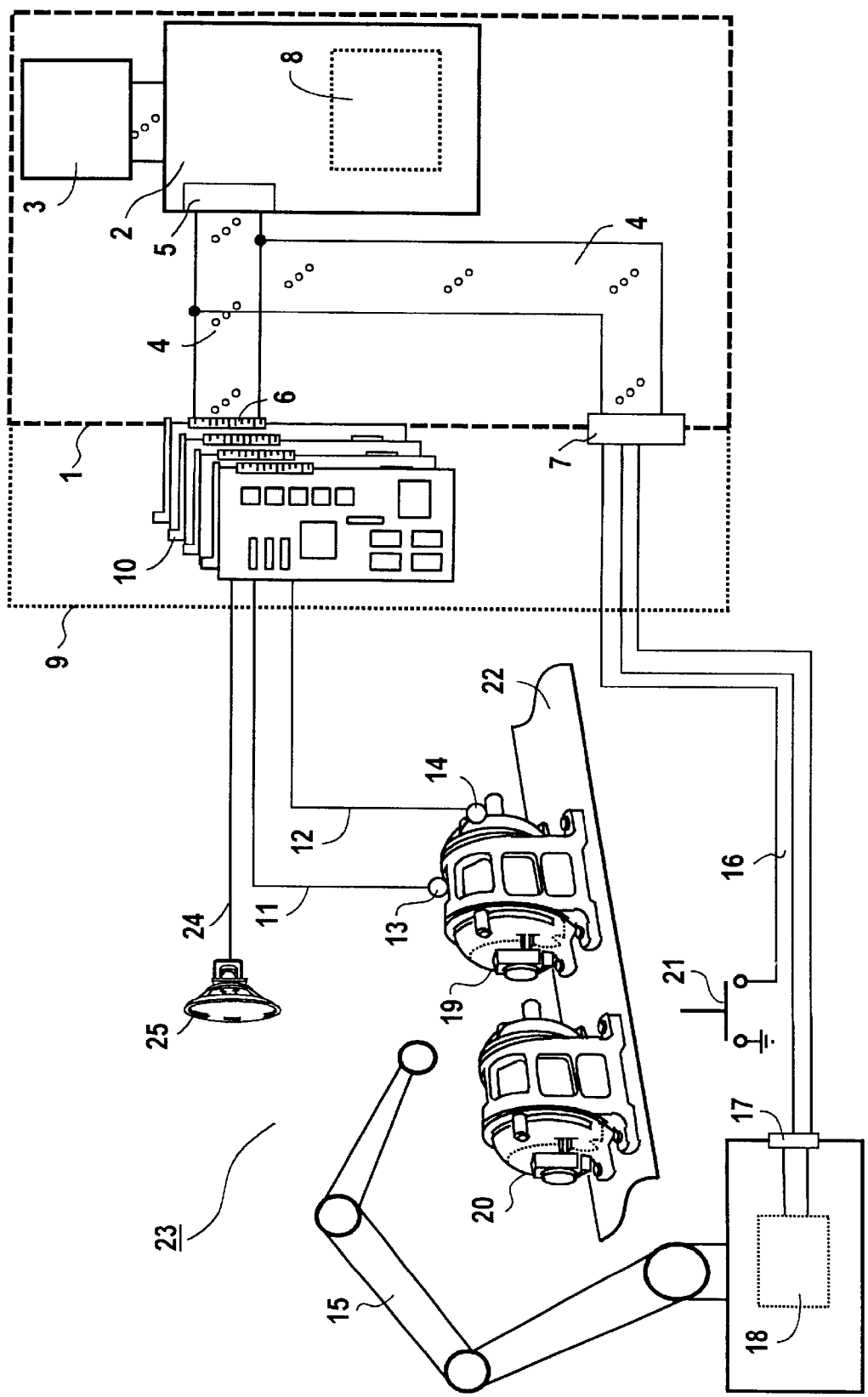

DEVICE FOR COLLECTING ANALOGUE MEASUREMENT SIGNALS FOR THE ACOUSTIC DIAGNOSIS OF TEST PIECES

BACKGROUND INFORMATION

For acquisition of especially large quantities of test signals whose meaning content goes beyond traditional physical quantities such as current, voltage and temperature, it has been customary in the past to use complex and specially assembled measurement arrangements. This is the case in particular when the test signals picked up by an industrial routine or an industrial device must be reprocessed, compiled and analyzed according to special strategies.

Such a case also occurs in acoustic diagnosis of test objects. In particular in the manufacture of machines and equipment having moving or rotating subcomponents, it is customary to perform routine acoustic testing or diagnosis in a test field. Such machines and equipment may include motors, generators, turbines or even vacuum cleaners, fans and many other items. Microphone-like vibration or acceleration sensors, for example, are mounted at one or more selected points on a test object, e.g., in the area of bearings, drives or shafts. A number of technical conclusions can be drawn from the acoustic and mechanical vibrations picked up and the structure-borne noise. For example, it is possible to determine the manufacturing quality of a test object or simulate actual values characterizing the condition of the production facilities used. Furthermore, it is possible to observe the manufacturing tolerances of known influencing quantities, wear-related phenomena and much more.

In acoustic testing and diagnosis of technical objects, it is also common to use powerful special hardware components to tie the test signal sensors to computerized devices that perform the analysis of the measured values.

SUMMARY OF THE INVENTION

An object of the present invention, is to provide an acquisition device for analog test signals which occur in the acoustic diagnosis of technical test objects, without requiring any special instrumentation if possible.

The present invention has the advantage that standard components can be used for test signal acquisition. This is achieved in particular with the device according to the present invention by the fact that the individual interface areas available are used in a controlled manner for implementation of technical subfunctions in test signal acquisition as part of the acoustic diagnosis with a standard device, e.g., one referred to informally as a personal computer. Thus, first standard external interfaces, preferably standard parallel interfaces of the computer are used, also fitted with standard interface cards, to digitize the analog test signals from vibration and acceleration sensors and enter them into the computer.

The object of controlling the test signal pick-up, i.e., in particular program-controlled switching of the test signal acquisition on and off, and preferably the control of optionally additional time-coordinated automatic handling operations with the respective test object and in its environment, is achieved by using second standard external interfaces of the standard computer. This is preferably standard serial interfaces of the standard computer. The usual interface provided for connecting a printer is especially suitable for this purpose. However, the interface usually provided for connecting an input device known conventionally as a mouse or a game port may also be used for this purpose. Trigger signals generated by at least one external switching means are entered into the computer via this interface, specifying the beginning and end of test signal acquisition. However, such trigger signals may also be output over the interface from the second area, for example, to control automatic manipulators acting on the test objects or automatic conveyor devices in a time-coordinated operation.

The use of the areas of external interfaces present in a standard computer for digitizing the test signals and for separate exchange of controlling trigger signals as proposed according to the present invention makes it possible to use standard computer hardware and in particular standard interface cards for analog-digital conversion of the analog test signals supplied by the vibration and acceleration sensors. It has surprisingly been found that interface cards can be used in a first area on an external interface designed for digital processing of vibrations of the respective test object approximately in the audible frequency range. Such interface cards may be standard hardware modules known as sound cards which are generally used for acoustic reproduction of digital speech and music information stored in the memory of the computer, i.e., for digital-analog conversion of corresponding digital files.

BRIEF DESCRIPTION OF THE DRAWING

The FIGURE shows a block diagram of an acquisition device for analog test signals in accordance with an exemplary embodiment of the present invention.

DETAILED DESCRIPTION

The figure show s a standard computer 1 in the form of a schematic wiring diagram. Of the usual components of such a computer, only processor 2, a memory 3 and data bus 4 located on a motherboard of computer 1 are shown. An executive routine 8 run by processor 2, controlling time-coordinated processing of the analog test signals obtained in acoustic analysis of a test object, is represented by a box shown with dashed lines in the block of processor 2.

Data bus 4 is connected by an internal interface 5 to processor 2 which thus receives data from data bus 4 or feeds data into it. On the other hand, the data bus branches off to interface areas. Computer 1 according to the present invention has at least one first area 6 and one second area 7 with external interfaces of data bus 4. In a separate interface area 9, which is preferably formed by a housing of the computer (not shown in the figure), outgoing lines and interface cards can be attached to the external interfaces of the data bus.

According to the present invention, at least one standard interface card 10 is connected in first area 6 to data bus 4 over an external interface. This has the function of digitizing analog test signals supplied by vibration and acceleration sensors and entering them at least into computer 1. The example in the figure shows a motor 19 which serves as a test object on which an acoustic diagnosis is to be performed. For example, vibration and acceleration sensors 13, 14 which generate analog test signals 11, 12 are mounted on the test object. These signals are in particular a measure of vibration and structure-borne noise occurring at selected points, especially on the surface of the motorized test object. Test signals 11, 12 are sent to an interface card 10 which is connected to data bus 4, preferably at a parallel external interface in area 6. Test signals 11, 12 are then converted to digitized form by an executive routine 8 run by processor 2 and are deposited in a connected memory 3.

The acquisition device according to the present invention also has at least one external switching means for generating a binary trigger signal which can be fed onto data bus 4 over an external interface in second area 7. In the example shown in the figure, a key 21 serves as the switching means. Trigger signal 16 triggered by this means is fed onto data bus 4 of computer 1 from second area 7 via an external interface. Input of digitized test signals 11, 12 into computer 1 can be turned on and off via the analysis of the instantaneous status of binary trigger signal 16 by executive routine 8 in computer 1. In the simplest case, the trigger signal can be activated or deactivated by manual operation of key 21.

One advantage of the present invention is that analog measured values picked up on the test object by vibration and acceleration sensors are digitized and input via interface cards connected to a first area of external interfaces, while acquisition of trigger signals that control an acoustic diagnostic procedure takes place at a second area of external interfaces of the computer. Only by t his functional division is it possible to acquire, for example, electric test signals representing acoustic vibrations on a test object with traditional interface cards 10 at the external interfaces of a traditional computer 1.

It is especially advantageous if the external interfaces in first area 6 are standard parallel interfaces of computer 1, and the external interfaces in second area 7 are standard serial interfaces of computer 1. This embodiment of the present invention makes it possible to use a conventional computer for test signal acquisition. It is also advantageous if the minimum of one external interface in second area 7, where the minimum of one external switching means 21 is connected for generating a binary trigger signal 16, corresponds to a standard interface, which is typically used to connect a printer to standard computer 1. Then with the help of the executive routine, functions needed as part of control of test signal acquisition for acoustic diagnosis are assigned to the signals at the interface, which usually represent functions for controlling printing, e.g., control signals that turn the printer on and off, cause a new page to be fed or signal a paper jam, for example. This will be explained in greater detail below. Thus, the bundle of trigger signal lines provided with reference number 16 in the figure is for externally generated signals that influence the execution of executive routine 8 in processor 2. On the other hand, trigger signals can also be triggered by executive routine 8 and delivered outward over an external interface, preferably serial interface 7.

The test signal acquisition device shown in the example in the figure advantageously also contains an automatic manipulator 1, e.g., an industrial robot. With this manipulator, vibration and acceleration sensors 13, 14 can be placed on a test object 19, 20 and removed again in a completely automatic operation, controlled in particular by executive routine 8 in computer 1. The start and stop of such actions, i.e., the readiness or non-readiness of test object 19 for testing, can be signaled to executive routine 8 in computer 1 by a corresponding binary trigger signal 16 which is input over a separate control 18 of manipulator 15, a separate interface 17 on this control 18 and an interface in second area 7. Thus, this permits a time-coordinated control of automatic manipulator 15 by executive routine 8 in computer 1 with the help of binary trigger signals 16, which are output from second area 7 over an interface or input through it.

The example of a test signal acquisition device shown in the figure also contains an automatic conveyor device 22 for supplying test objects to automatic manipulator 1 in a program-controlled routine. Test objects 19 and 20 are shown as examples. As already described above, test object 19 is being subjected to an acoustic diagnosis, while test object 20 is ready for such a diagnosis to be performed. Here again, a fully automatic, time-coordinated control of automatic conveyor device 22 by executive routine 8 in computer 1 can be accomplished with the help of binary trigger signals 16 which are at least output from second area 7 over an interface. It is also possible, for example, for a corresponding trigger signal 16 to signal to executive routine 8 that a desired position of conveyor device 22 has been reached.

In the example shown in the figure, the readiness of test object 19 for testing can be signaled to executive routine 8 from second area 7 by a trigger signal 16 generated by manipulator 1 over a preferably serial interface. The executive routine then causes the start of the recording of analog test signals 11, 12 by interface card 10 at the external interface of second area 6. The test signals can be processed further by processor 2 and deposited in a memory 3, for example. The acquisition of test signals can be stopped by a corresponding command directed by executive routine 8 at interface card 10 and transmitted there by data bus 4. At the same time, a corresponding trigger signal 16 is generated by executive routine 8 and conveyed over an interface from second area 7 to manipulator 15 and the conveyor device. Manipulator 15 then automatically removes vibration and acceleration sensors 13, 14 from test object 19, conveyor device 22 conveys test object 20 into a corresponding test position, and manipulator 15 then applies vibration and acceleration sensors 13, 14 to the proper locations on test object 20. The sequence of these technical actions can be controlled completely by executive routine 8 via trigger signals 16.

In testing a second test object 20, there is the possibility that acoustic test signals which are picked up from one or more preceding test objects and deposited in memory 3, for example, may be output over data bus 4 and interface card 10 to a playback device, e.g., a loudspeaker 25 connected by line 24 to interface card 10. The operating personnel can thus compare an acoustic setpoint noise level output over loudspeaker 25, for example, with the actual noise level delivered by the present test object. Thus, initial tests are already possible as part of the acoustic diagnosis of a test object.

The present invention has the advantage that an acoustic diagnostic test stand 21, which is shown as an example in the figure and can be equipped with an automatic manipulator 15 at least for positioning the test signal pickups and with an automatic conveyor device for positioning the test objects, can be controlled in a fully automatic manner without requiring the use of special hardware components. Instead, conventional standard components, such as personal computers and sound cards can be used as computer 1 and interface cards 10 for digitizing and analog reconversion of the analog test signals.

We claim:

1. A device for acquisition of analog test signals for acoustic diagnosis of a test object, comprising:
   a. at least one sensor sensing analog test signals from the test object, the at least one sensor including at least one of a vibration sensor and a acceleration sensor;
   b. a standard computer having at least a first and second area with external interfaces to a data bus of the computer;
   c. at least one standard interface card coupled to the data bus in the first area over at least one of the external interfaces in the first area, the at least one standard interface card digitizing the analog test signals from the at least one sensor and inputting the digitized test signals into the computer;

d. at least one switch generating a binary trigger signal, the binary trigger signal being input onto the data bus in the second area over at least one of the external interfaces; and e. an executive routine in the computer, the executive routine turning on and off the input of digitized test signals after analysis of an instantaneous status of the binary trigger signal.

2. The device according to claim 1, wherein the external interfaces in the first area include at least one standard parallel interface of the computer.

3. The device according to claim 1, wherein the external interfaces in the second area include at least one standard serial interface of the computer.

4. The device according to claim 1, wherein the at least one of the external interfaces in the second area to which the at least one switch is coupled includes a standard printer interface.

5. The device according to claim 1, wherein the at least one standard interface card digitizes analog test signals from the at least one sensor which correspond approximately to vibrations of the test object in an audible frequency range.

6. The device according to claim 1, further comprising:

an automatic manipulator placing the at least one sensor on the test object and removing the at least one sensor from the test object in a program-controlled operation, a readiness of the test object for testing being signaled to the executive routine by the binary trigger signal input into the second area over the at least one of the external interfaces.

7. The device according to claim 6, wherein binary trigger signals are output from the second area over an interface, a time-coordinated control of the automatic manipulator by the executive routine being performed as a function of the output binary trigger signals.

8. The device according to claim 6, further comprising:

an automatic conveyor device conveying the test object in a program-controlled operation to the automatic manipulator.

9. The device according to claim 8, wherein a time-coordinated control of the automatic conveyor device by the executive routine is triggered by the output binary trigger signals.

10. The device of claim 1, wherein a readiness of the test object for testing is signaled to the executive routine by the binary trigger signal and wherein an automatic manipulator places the at least one sensor on the test object to ready the test object for testing prior to the binary trigger signal being generated.

11. The device of claim 10, wherein a binary trigger signal is output from the second area over an interface, with a time-coordinated control of the automatic manipulator being performed by the executive routine as a function of the output binary trigger signal.

12. The device of claim 11, wherein the automatic manipulator removes at least one sensor from a test object in a program controlled operation.

13. The device of claim 10, wherein a conveyer conveys the test object to the automatic manipulator in a program controlled operation.

14. The device of claim 13, wherein the binary trigger signals to the executive routine that a desired position of the conveyer has been reached.

15. A device for acoustic diagnosis of a test object, comprising:

a computer, having at least a first and second area with external interfaces to a data bus of the computer;

at least one standard interface card coupled to the data bus in the first area over at least one of the external interfaces in the first area, the at least one standard interface card being adapted to digitize analog test signals of a test object from at least one of a vibration and acceleration sensor, and being adapted to input the digitized test signals into the computer, wherein a binary trigger signal is adapted to be input onto the data bus in the second area over at least one of the external interfaces and wherein an executive routine in the computer is adapted to coordinate the input of digitized test signals based upon an analysis of a status of the binary trigger signal.

16. The device according to claim 15, wherein the external interfaces in the first area include at least one standard parallel interface of the computer.

17. The device according to claim 16, wherein the external interfaces in the second area include at least one standard serial interface of the computer.

18. The device according to claim 15, wherein the at least one of the external interfaces in the second area is coupled to a standard printer interface, for generating the binary trigger signal.

19. The device according to claim 15, wherein the at least one standard interface card is adapted to digitize analog test signals from the at least one sensor which correspond approximately to vibrations of the test object in an audible frequency range.

20. The device of claim 15, wherein a readiness of the test object for testing is signaled to the executive routine by the binary trigger signal and wherein an automatic manipulator places the at least one sensor on the test object to ready the test object for testing prior to the binary trigger signal being generated.

21. The device of claim 20, wherein a binary trigger signal is output from the second area over an interface, with a time-coordinated control of the automatic manipulator being performed by the executive routine as a function of the output binary trigger signal.

22. The device of claim 21, wherein the automatic manipulator removes at least one sensor from a test object in a program controlled operation.

23. The device of claim 20, wherein a conveyer conveys the test object to the automatic manipulator in a program controlled operation.

24. The device of claim 23, wherein the binary trigger signals to the executive routine that a desired position of the conveyer has been reached.

* * * * *